US005971255A

United States Patent [19]

Yamamoto et al.

[11] Patent Number: 5,971,255

[45] **Date of Patent: *Oct. 26, 1999**

[54] PROCESS AND APPARATUS FOR PRODUCTION OF METALLIC HONEYCOMB BODY FOR SUPPORTING CATALYST

[75] Inventors: Yukihiro Yamamoto, Futtsu; Takuzou Kako, Tokai; Kazuo Yoshida; Yuuji Nakashima, both of Futtsu; Kouji Yoshizaki, Numazu; Takaaki Itou, Mishima, all of Japan

[73] Assignees: Nippon Steel Corporation, Tokyo; Toyota Jidosha Kabushiki Kaisha, Toyota, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/789,772

[22] Filed: Jan. 28, 1997

Related U.S. Application Data

[63] Continuation of application No. 08/626,740, Apr. 2, 1996.

[30] Foreign Application Priority Data

Apr. 5, 1995 [JP] Japan ..................................... 7-80514

[51] Int. Cl.$^{6}$ ............................ B23K 31/00; B01J 32/00

[52] U.S. Cl. .......................... 228/181; 228/253; 228/255

[58] Field of Search .................................... 156/205, 210, 156/292, 184, 188, 190, 191, 290; 502/439, 527; 228/173.7, 181, 183, 253, 255, 246

[56] References Cited

U.S. PATENT DOCUMENTS

| | | | |
|---|---|---|---|
| 5,002,923 | 3/1991 | Koshiba et al. | 502/439 |
| 5,084,361 | 1/1992 | Toyoda et al. | 228/181 X |
| 5,618,498 | 4/1997 | Konya et al. | 228/181 X |

FOREIGN PATENT DOCUMENTS

| | | |
|---|---|---|
| 0263324 | 4/1988 | European Pat. Off. . |
| 0351841 | 1/1990 | European Pat. Off. . |
| 62-282644 | 8/1987 | Japan . |
| 5-168946 | 7/1993 | Japan . |
| 5-179939 | 7/1993 | Japan . |
| 6-39295 | 2/1994 | Japan . |
| 6-218290 | 8/1994 | Japan . |
| 6-238175 | 8/1994 | Japan . |
| 7-54644 | 2/1995 | Japan . |

*Primary Examiner*—James Engel
*Attorney, Agent, or Firm*—Kenyon & Kenyon

[57] ABSTRACT

In the production of a metallic honeycomb body for use as a metallic carrier, for supporting a catalyst, in the purification of an exhaust gas from automobiles or the like, a desired joint site for each layer constituting the metallic honeycomb body is preset, and, when a portion of contact between a metallic corrugated foil and a metallic flat foil for forming the metallic honeycomb body has reached the joint site, a brazing foil which has been cut into a predetermined length is inserted and enfolded in the contact portion.

8 Claims, 6 Drawing Sheets

PROCESS AND APPARATUS FOR PRODUCTION OF METALLIC HONEYCOMB BODY FOR SUPPORTING CATALYST

This application is a continuation of application Ser. No. 08/626,740 filed Apr. 2, 1996 (pending).

BACKGROUND OF THE INVENTION

1. Field of the Invention

The present invention relates to a process and an apparatus for the production of a metallic honeycomb body, for supporting a catalyst, for use in a catalytic converter for the purification of an exhaust gas discharged from an internal combustion engine and in a catalytic converter in a chemical plant.

2. Description of the Prior Art

In recent years, a catalytic converter using a metallic honeycomb body as a catalyst carrier, constituted by a stack of metallic foils, has become adopted, for example, in the purification of an exhaust gas discharged from internal combustion engines, particularly automobiles. In this case, as shown in FIGS. 6 (A) and (B), a metallic flat foil b and a metallic corrugated foil c, with the flat foil and the corrugated foil stacked on top of the other, are spirally wound on a winding shaft a, thereby forming a honeycomb body e having a large number of through holes o in the direction of the winding shaft, and the honeycomb body e thus obtained is then fitted into a metallic casing d to form a cylindrical metallic carrier f.

In the production of the metallic honeycomb body e, in order that the structural strength is ensured to realize stabilized catalyst carrier functions, it is common practice to braze the flat foil b and the corrugated foil c, constituting the metallic honeycomb body e, to the casing d, thereby integrating the metallic honeycomb body e with the casing d.

An example of conventional methods for joining a flat foil b to a corrugated foil c in the production of a metallic honeycomb body e comprises winding a flat foil b and a corrugated foil c with the flat foil and the corrugated foil stacked on top of the other, fixing the outermost circumferential end of the flat foil b, press-fitting the resultant spiral into a metallic casing d, spreading a powdery brazing metal in the interior of the assembly, heating the assembly to deposit the powdery brazing metal between the corrugated foil and the flat foil and between the metallic honeycomb body and the metallic casing, thereby joining the corrugated foil to the flat foil and, at the same time, joining the metallic honeycomb body to the metallic casing.

This method, however, is disadvantageous in that it is difficult to surely spread and deposit the powdery brazing metal at the sites to be joined, a sure and stable joint cannot be provided, and the cost of the powdery brazing metal is high.

In order to solve these problems, for example, another jointing method, as shown in FIG. 7, has been proposed. This method comprises providing a brazing foil g, which has been previously cut into a very small piece, for example, a piece having an approximate size of 0.05 mm in thickness×1 mm in width×12 mm in length, at predetermined intervals on predetermined positions of the flat foil, connecting the flat foil b and the corrugated foil c to a winding shaft a, which serves also as an electrode, winding them, with the flat foil b and the corrugated foil c stacked on top of the other, on the winding shaft a to form a honeycomb body e having a predetermined dimension, fixing the outermost circumferential end of the flat foil b, fitting the honeycomb body into a metallic casing, and heating the assembly in a vacuum furnace to melt the brazing foil to join the flat foil b, the corrugated foil c, and the metallic casing d to one another.

In the production of a cylindrical metallic honeycomb body e by this method, however, since the wave height and pitch of the corrugated foil c vary, the relative position of the cut brazing foils g varies even when winding is carried out under constant conditions, so that, in some cases, the joint sites between the flat foil b, the corrugated foil c and the metallic casing d are often shifted from a predetermined joint site region.

The brazing foil g used herein functions to join the flat foil b, the corrugated foil c, and the metallic casing d to one another. When the metallic honeycomb body e is incorporated into an electric heating type catalytic converter to permit a current to flow across the winding shaft a and the metallic casing d to heat the metallic foils per se, thereby enabling the temperature of the metallic honeycomb body to be raised to the catalytic activation temperature in a short time, the brazing foil g functions also to form joints which can be energized.

For this reason, the shift of the sites of joints by the brazing foil from the predetermined region gives rise to problems such as lowered joint strength, deviation of a heat pattern created by energization to cause a failure of heat to be generated, leading to a deterioration in the above functions of the metallic honeycomb body and a lowering in dimensional accuracy. This in turn results in lowered yield of acceptable honeycomb body products and, hence, lowers the productivity of the metallic honeycomb body (see Japanese Unexamined Patent Publication (Kokai) No. 179939/1993).

SUMMARY OF THE INVENTION

In view of the above, an object of the present invention is to surely feed a brazing foil into desired sites between a corrugated foil and a flat foil.

Another object of the present invention is to join a corrugated foil and a flat foil with the aid of a brazing foil at the optimal sites, enabling a strong catalyst carrier to be produced.

A further object of the present invention is to produce a catalyst carrier which can be heated in a short time to a temperature at which a catalyst supported on a metallic honeycomb body is activated.

A still further object of the present invention is to provide a production process and an apparatus which can stably produce a metallic honeycomb body with good productivity.

The above objects of the present invention can be attained by the following process and apparatus.

According to one aspect of the present invention, there is provided a process for producing a metallic honeycomb body for use as a catalyst carrier, comprising the step of: spirally winding a metallic corrugated foil and a metallic flat foil together, with the metallic flat foil stacked on the metallic corrugated foil, on a winding shaft to form a metallic honeycomb body, wherein desired joint sites in layers formed by the winding are previously specified and, when a site of contact between the inner or outer surface of the flat foil and the outer or inner surface of the corrugated foil has coincided with the preset joint site, a previously cut brazing foil is inserted in the contact site and enfolded in the metallic foils, thereby feeding the brazing foil.

A method and an apparatus for determining the above desired joint sites will be described. For example, an angle detector is provided which detects the number of turns+angle x (desired angle) from the origin defined as a joint starting point at which the front ends of the flat foil and the corrugated foil are joined to the winding shaft. Separately, angles from the origin (total number of turns+angle x), at which each brazing foil is inserted into each layer, are preset in a setter. When the total number of turns and angle detected by the angle detector have coincided with the preset number of turns and angle, a brazing foil inserting device provided with a drive control device is operated to insert a brazing foil into a predetermined site between the flat foil and the corrugated foil.

The above insertion means, unlike the prior art, can reduce the influence of a variation in the wave height and pitch of the corrugated foil and effectively prevent the occurrence of a failure of jointing and heat generation. Further, since the site for the insertion of a brazing foil is regulated by an angle to reduce a cumulative error, the relative positioning accuracy for joint can be stably ensured within a specified range even though the wave height and pitch of the corrugated foil has varied. This reduces the variation in quality of honeycomb bodies, markedly improves the yield, and, at the same time, enables the production of the honeycomb body to be automated. Further, the step of mounting a cut brazing foil on the corrugated foil or the flat foil prior to winding can be eliminated, resulting in improved productivity of the metallic honeycomb body.

Other objects, features and benefits of the present invention will be fully understood from the following description with reference to the accompanying drawing.

BRIEF DESCRIPTION OF THE INVENTION

A preferred form of the present invention is illustrated in the accompanying drawings in which.

DETAILED DESCRIPTION OF THE INVENTION

Figure 1:
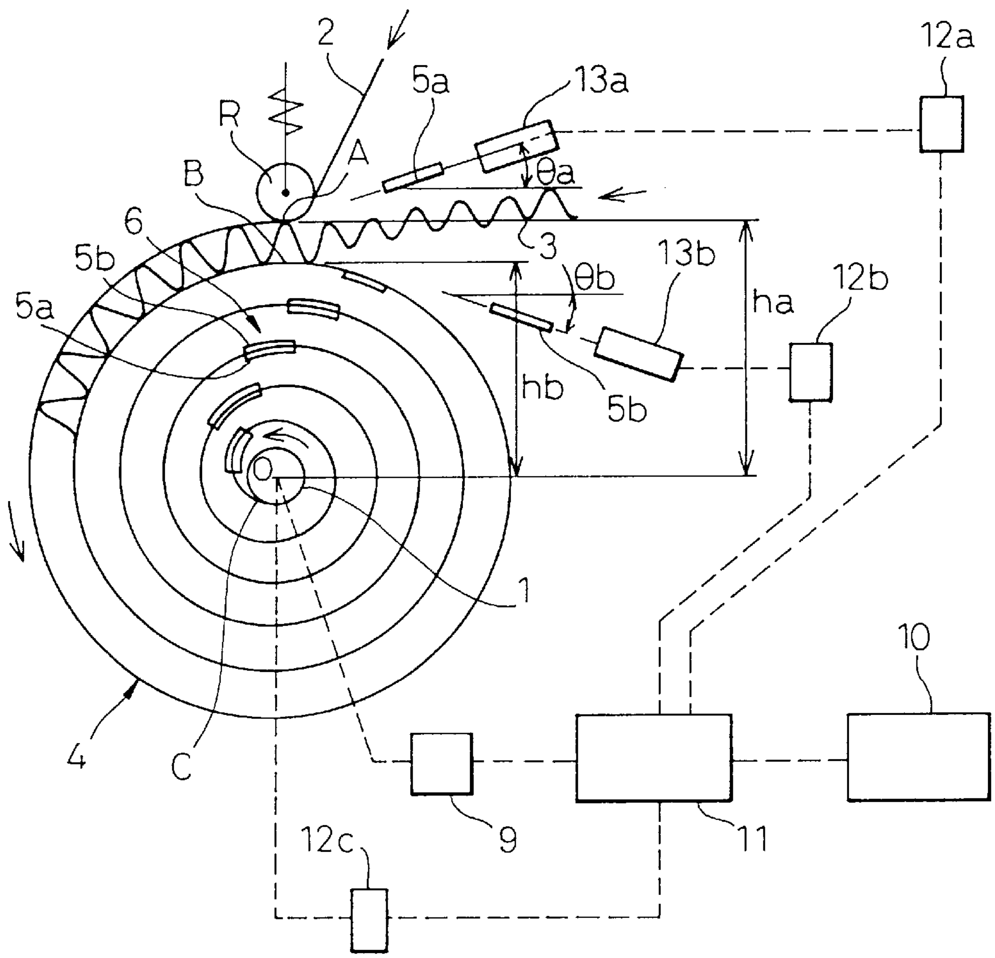
FIG. 1 is a plan view showing a fundamental concept of one embodiment of the present invention.

The present invention will be described in more detail with reference to the accompanying drawings. FIG. 1 is a schematic view showing an embodiment of the present invention. In this embodiment, a metallic honeycomb body used in an electric heating type catalytic converter is formed.

Figure 6A:
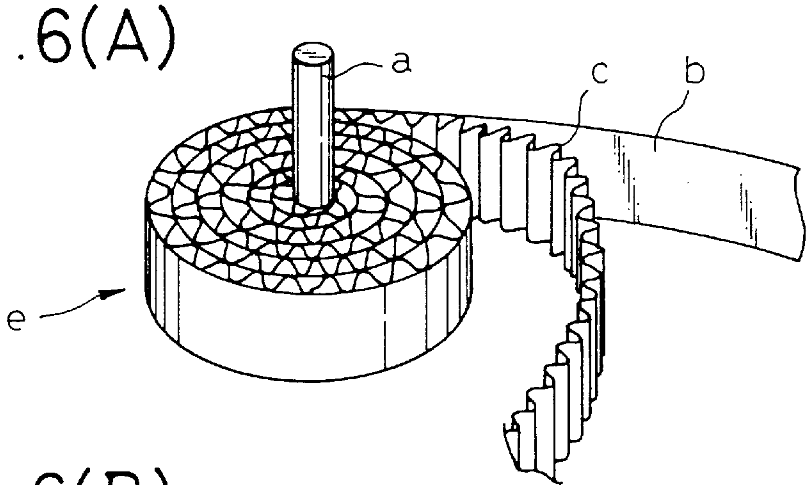
FIG. 6 (A) is a perspective view showing the conventional process for producing a metallic honeycomb body, and FIG. 6 (B) is a plan view showing the conventional metallic honeycomb body.
Figure 6B:
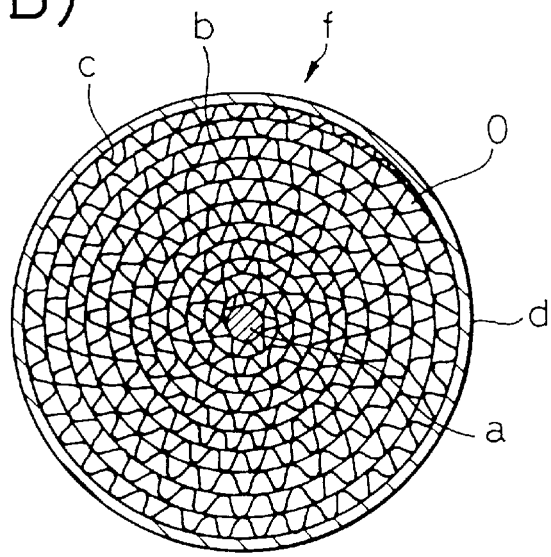
Figure 7:
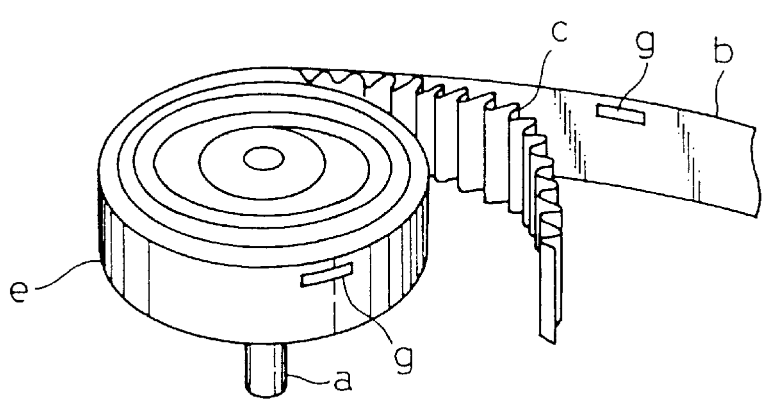
FIG. 7 is a perspective view showing an example of joint by a brazing foil in the conventional metallic honeycomb body.

Specifically, in the above catalytic converter, a brazing foil for joining a flat foil and a corrugated foil to each other has an electrical conducting function and is disposed while leaving a predetermined distance from the preceding brazing foil for each turn of layer so that an electric passage is provided between a central electrode in a rod form provided in the center of the metallic honeycomb body and an external electrode as a cylindrical casing for housing the metallic honeycomb body. As shown in FIGS. 6 (A) and (B), the above metallic honeycomb body is in a cylindrical form prepared by spirally winding a strip of a corrugated foil and a strip of a flat foil together, with the corrugated foil and the flat foil stacked on top of the other, on a winding shaft.

In FIG. 1, the front ends of a flat foil 2 and a corrugated foil 3 are joined to a winding shaft 1, and the winding shaft 1 is turned with a certain tension applied the flat foil and the corrugated foil to spirally wind the flat foil 2 and the corrugated foil 3, thereby forming a cylindrical metallic honeycomb body 4. In this case, for each foil layer formed in the radial direction, foils **5*a*, 5*b* cut into a predetermined length are inserted respectively into point A at which the inner surface of the flat foil 2 comes into contact with the outer surface of the corrugated foil 3 and point B at which the outer surface of the flat foil 2 comes into contact with the inner surface of the corrugated foil 3**.

Figure 2:
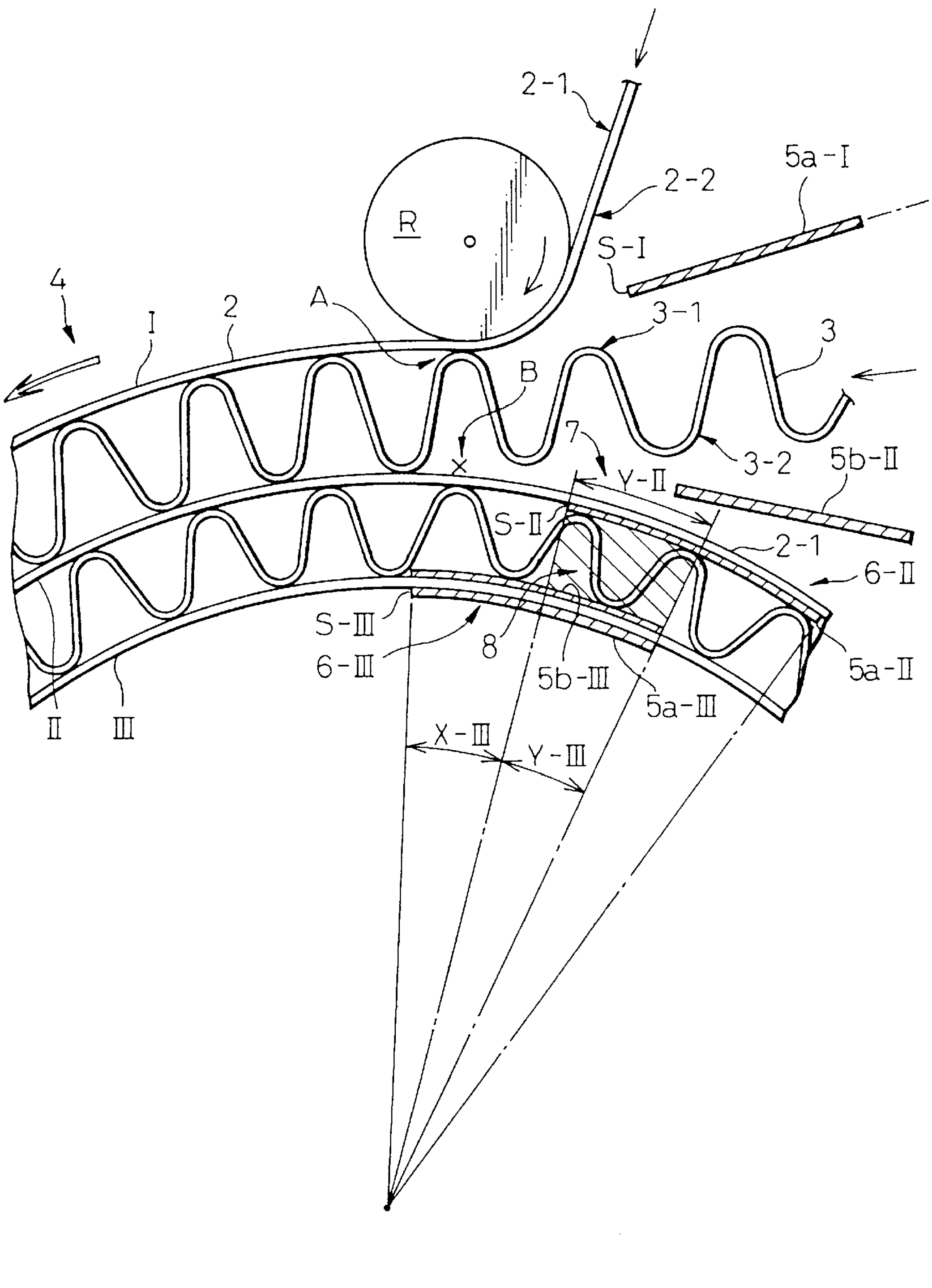
FIG. 2 is a partially enlarged plan view showing an example of arrangement of sites of joints by a brazing foil in the embodiment shown in FIG. 1.

Details of the state of insertion of the brazing foil between the flat foil and the corrugated foil are shown in FIG. 2. In the drawing, brazing foils **5*a*III, 5*b*III are inserted respectively into the inner and outer surfaces of the flat foil 2 in a joint 6III of a metallic foil layer III, and, in a joint 6II of a metallic foil layer II, a brazing foil 5*a*II is inserted into the inner surface of the flat foil 2 in its position shifted by an angle XIII from a starting end SIII of the joint 6III. Therefore, the joint 6III overlaps with the joint 6II in a region defined by an angle YIII of the joint 6**III.

Further, after the brazing foil **5*a*II is inserted at the point A, the metallic honeycomb body 4 is turned by 360° in a direction indicated by an arrow, and, when the starting point SII of the brazing foil 5*a*II has reached the point B, a brazing foil 5*b*II is inserted by means of a brazing foil inserting device 13*b* into between the inner surface 3-2 of the corrugated foil 3 and the outer surface 2-1 of the flat foil 2. Similarly, when the metallic honeycomb body is turned by an angle XI (not shown), a brazing foil 5*a*I is inserted by means of the brazing foil inserting device 13*a* into point A at which the outer surface 3-1 of the corrugated foil 3 comes into contact with the inner surface 2—2 of the flat foil 2. Further, when the metallic honeycomb body is turned by 360° so that the starting end SI of the brazing foil 5*a*I reaches the point B, a brazing foil 5*b***I is inserted.

Thus, the brazing foils **5*a* and 5*b* are disposed, on both sides of the flat foil 2**, symmetrically about the flat foil and while shifting the joint site at given intervals for each metallic foil layer.

As described above, in this embodiment, since the metallic honeycomb body is used as a catalyst carrier in an electric heating type catalytic converter, the arrangement of joints 6 by the brazing foils **5*a* and 5*b* should be such that a predetermined overlap 7 should be provided between adjacent joints in the radial direction to accurately form an electric passage 8**.

For this purpose, in the present invention, the turning of the metallic honeycomb body by a predetermined angle and the insertion of the brazing foil are carried out using the following apparatus.

FIG. 1 is a schematic diagram showing an embodiment of an apparatus which can accurately handle a brazing foil and insert the brazing foil into a predetermine site between a flat foil and a corrugated foil.

In the drawing, an angle detector 9 connected to the winding shaft 1 detects, in the course of winding the flat foil 2 and the corrugated foil 3, the number of turns of the flat foil 2 and the corrugated foil 3 from an origin, for example, a winding starting point c, and the angle of the flat foil 2 and the corrugated foil 3 from the origin, caused by turning the winding shaft 1.

The angle detector 9 communicates with a setter 10 through a computing unit 11. In the setter 10, sites into which the brazing foils 5*a*, 5*b* are to be inserted are preset in terms of the angle from the origin C (total number of turns+angle X), and the preset values are previously input into the computing unit 11.

The total number of turns and angle signals detected by the angle detector are input into the computing unit 11, and the input values are compared with the preset number of turns and angle X which have been input into the computing unit 11. When the values from the angle detector 9 coincide with those from the setter, the computing unit 11 transmits signals to drive control devices 12*a*, 12*b*, 12*c*. The drive control device 12*c* transmits signals to a drive unit for the winding shaft. This stops the turning of the winding shaft 1 and operates brazing foil inserting devices 13*a*, 13*b* to insert brazing foils 5*a*, 5*b*, which have been previously cut into a predetermined size, into predetermined sites between the flat foil 2 and the corrugated foil 3 being in a stopped state. Upon the completion of the insertion of the front end of the brazing foils, the winding shaft 1, in response to signals from the drive control device 12*c*, begins to turn, inserting and disposing the brazing foils in the predetermined sites.

Since the brazing foil insertion site varies from layer to layer, the inserting devices 13*a*, 13*b* are designed so that distances from the center of the winding shaft 1 to the insertion site, ha and hb, and oblique angles for insertion, θa and θb, are variable. In the setter 10, operating conditions for the inserting devices 13*a*, 13*b* are preset according to the brazing foil insertion site in each layer, and the inserting devices 13*a*, 13*b* are controlled according to the preset operating conditions through the computing unit 11 and the drive control devices 12*a*, 12*b*, 12*c*.

The insertion of the brazing foil will be further described with reference to FIG. 3.

Figure 3:
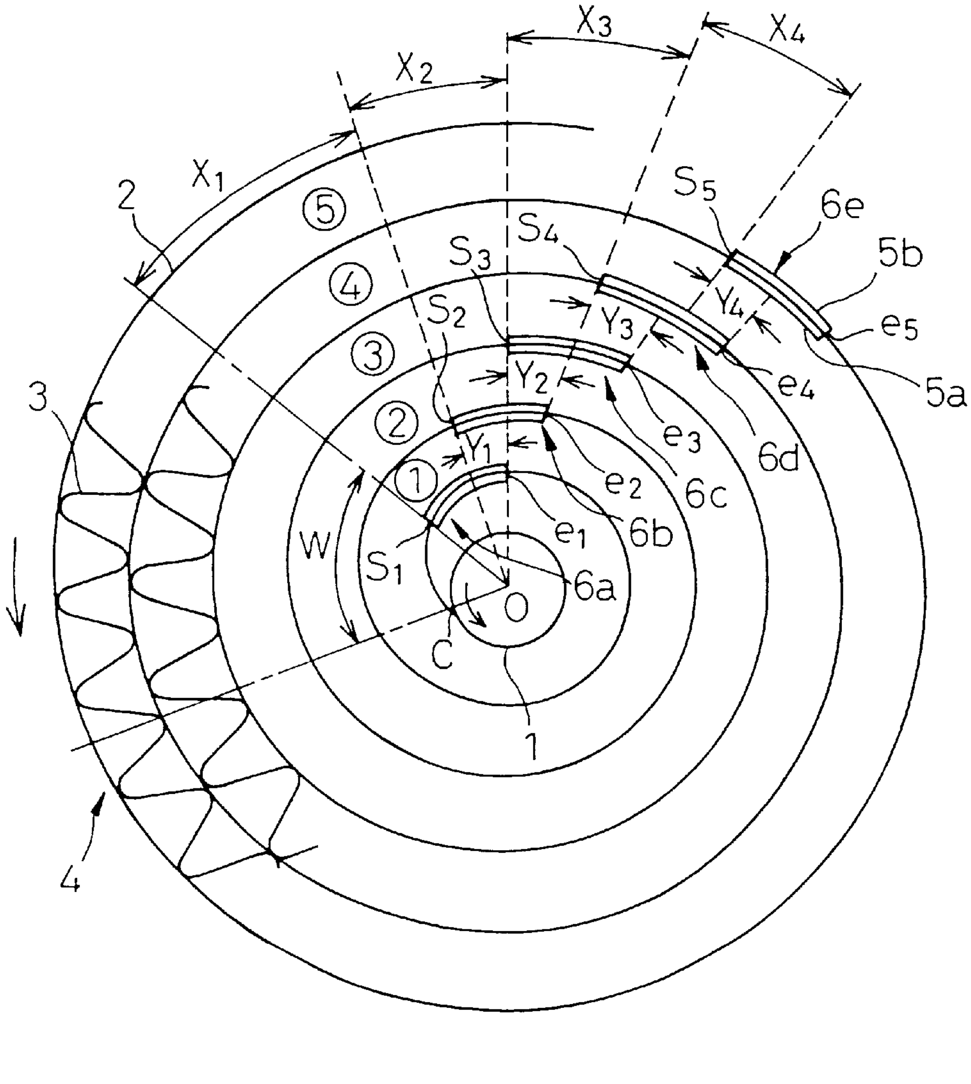
FIG. 3 is a plan view showing a concept of setting of a brazing inserting site in the present invention.

FIG. 3 is a conceptual diagram showing setting of brazing foil insertion sites, points A and B, for each layer in an embodiment where the length of the brazing foils 5*a* and 5*b* is constant and an overlap, having a given width y, for constituting an electric passage is formed between adjacent joints in the radical direction.

At the outset, the insertion of a brazing foil 5*a* at point A will be described.

A joint C where a flat foil and a corrugated foil are joined to a winding shaft 1 is regarded as the origin, and a brazing foil 5*a* is inserted by means of an inserting device 13*a* into layer (1) so that a starting end S1 is located at an angle W, thereby forming a joint 6*a*.

Next, a joint 6*b* is formed in layer (2). In this case, a starting end S2 of a brazing foil in a joint 6*b*, for layer (2), which is positioned outside and adjacent to the joint 6*a* in the layer (1) in the radial direction, is located at a position of $(360°+X_1°)$ with the starting end S1 of the brazing foil in the joint 6*a* as the starting point, thereby forming an overlap having a width $y_1$, for constituting an electric passage, between a terminal $e_1$ of the brazing foil in the joint 6*a* in the layer (1) and the starting end of the brazing foil in the joint 6*b* in the layer (2).

The starting end of a brazing foil in a joint 6*c*, which is positioned outside and adjacent to the joint 6*b* in the layer (2) in the radial direction, is located at a position of $(360°+X_2°)$ with the starting end of the brazing foil in the joint 6*b* as the starting point, thereby forming an overlap having a width $y_2$, for constituting an electric passage, between a terminal $e_2$ of the brazing foil in the joint 6*b* and the starting end of the brazing foil in the joint 6*c*.

The starting end of a brazing foil in a joint 6*d* in a layer (4), which is positioned outside and adjacent to the joint 6*c* in the layer (3) in the radial direction, is located at a position of $(360°+X_3°)$ with the starting end of the brazing foil in the joint 6*c* as the starting point, thereby forming an overlap having a width $y_3$, for constituting an electric passage, between a terminal $e_3$ of the brazing foil in the joint 6*c* and the starting end of the brazing foil in the joint 6*d*.

The starting end of a brazing foil in a joint 6*e* in a layer (5), which is positioned outside and adjacent to the joint 6*d* in the layer (4) in the radial direction, is located at a position of $(360°+X_4°)$ with the starting end of the brazing foil in the joint 6*d* as the starting point, thereby forming an overlap having a width $y_4$, for constituting an electric passage, between a terminal $e_4$ of the brazing foil in the joint 6*d* and the starting end of the brazing foil in the joint 6*e*.

Thus, conditions for disposition of a brazing foil in each layer are set.

In the course of winding of the flat foil 2 and the corrugated foil 3 on the winding shaft 1, when the total number of turns and the angle x from the origin C detected by the angular detector 9 have reached the above present values, the brazing foil 5*a* is inserted for each layer. The angle detector 9 is of a type which can record the history of a total angle from the origin C, preventing the accumulation of angle errors.

Although the insertion of the brazing foil 5*a* at the point A has been described above, the insertion of the brazing foil 5*b* at the point B can be done in the same manner as described above in connection with the insertion at the point A, except that the inserting device 13*b* is used.

In this embodiment, however, the following points should be noted. The point A is located at a position which is different by approximately one turn from the position of the point B. Further, for the point A, the insertion site is on the inner surface side of the flat foil, while for the point B, the insertion site is on the outer surface side of the flat foil. Furthermore, the insertion at the point A is different from the insertion at the point B also in the insertion angle θb and the distance hb from the center of the winding shaft. For this reason, the inserting device may be designed so that operating conditions for the insertion of the brazing foil at the point A may be set separately from those for the insertion of the brazing foil at the point B and the operation for the insertion of the brazing foil at the point A and the operation for the insertion of the brazing foil at the point B are controlled through interlocking with the operation of the winding mechanism.

Thus, the production of a metallic honeycomb body and the operations associated therewith may be easily automated by interlocking the mechanism for winding the flat foil and the corrugated foil, the drive control circuit for the drive mechanism of the brazing foil insertion mechanism, and the computing circuit for drive conditions, and controlling individual drive mechanisms in an interlocked manner through the computing circuit according to the conditions for the casing and the metallic honeycomb body.

Figure 4:
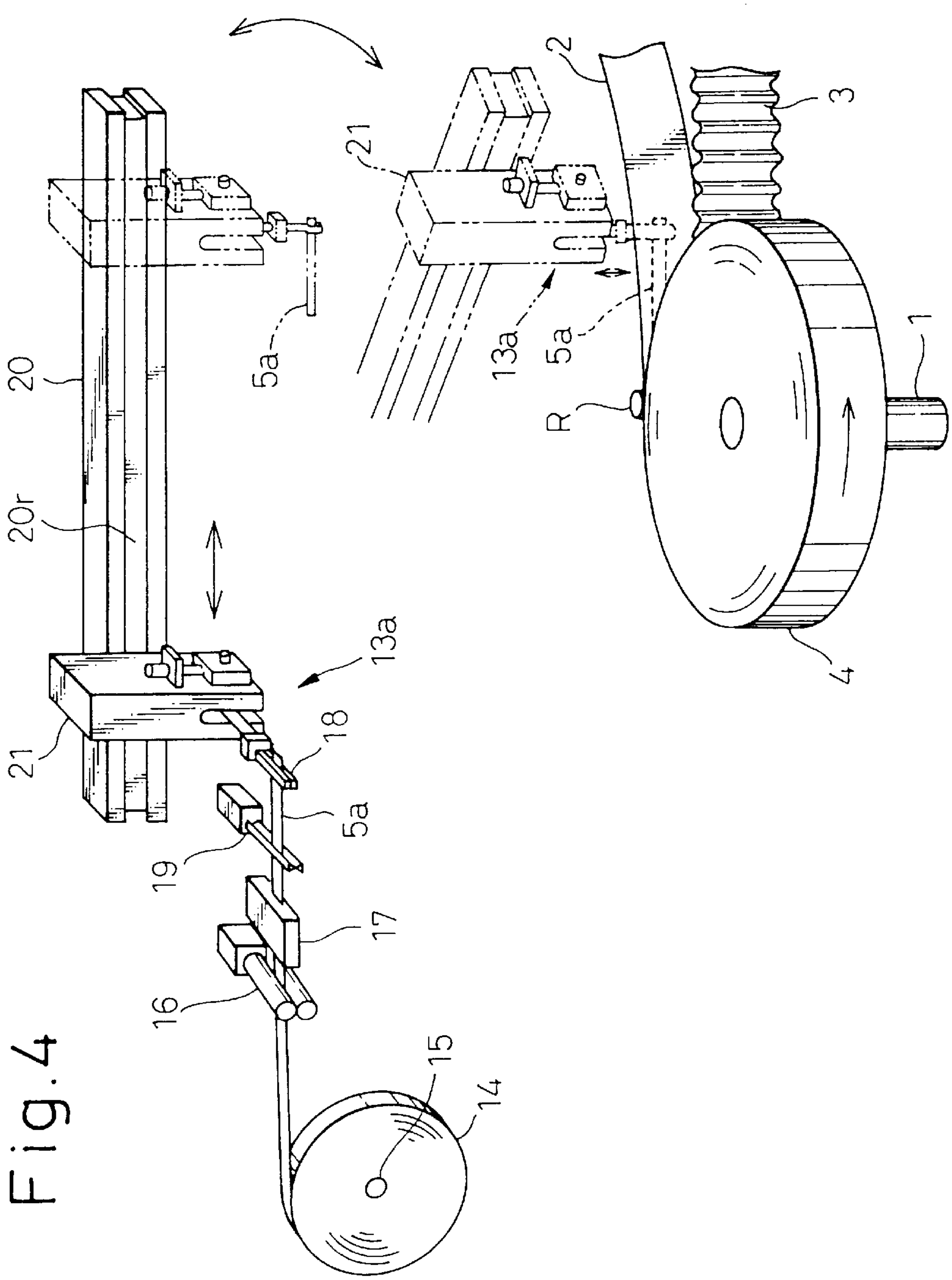
FIG. 4 is a perspective view showing one embodiment of a brazing inserting device according to the present invention.

An embodiment of an inserting mechanism used for the insertion of a brazing foil in the present invention is shown in FIG. 4. Specifically, FIG. 4 shows an inserting device 13a for inserting a brazing foil 5a.

In FIG. 4, a brazing foil coil 14 is rotatably supported on a support shaft 15. The front end of the brazing foil coil 14 is sandwiched and supported between pinch rolls 16 and fed, to a predetermined length through a delivery guide 17 into a holding jig 18 for holding the front end of the brazing foil.

A foil cutter 19 is provided in the vicinity of the delivery guide 17. The front end of the brazing foil coil 14 is held with the holding jig 18 by taking advantage of very small force, and, in this state, the brazing foil coil is cut with the brazing foil cutter 19 into a predetermined length. The holding jig 18 is supported rotatably and vertically movably on a movable body 21. The movable body 21 is moved on a track 20r of a support 20. In the present invention, the holding jig 18 and the movable body 21 constitute an inserting device 13a.

Support 20 is rotatably supported in the horizontal direction by a rotating device (not shown) so that the track 20r formed on the support 20 may be horizontally varied in position relative to the winding shaft 1.

The holding jig 18, in response to an instruction from the drive control device 12a, holds a brazing foil 5a, which has been cut with the brazing foil cutter 19, and, together with the movable body 21, moves on the track 20r. In the course of the movement, the holding jig 18 is rotated so that the foil in a horizontal state is brought to a vertical state, and, at the same time, the support 20 is rotated in the horizontal direction to place the brazing foil 5a above a position in the vicinity of the position where the flat foil 2 and the corrugated foil 3 come into contact with, and are stacked on top of, each other.

Thereafter, in response to an instruction, from the drive control device 12a, for inserting the brazing foil, the holding jig 18 is allowed to descend to place the brazing foil 5a in a predetermined position between the flat foil 2 and the corrugated foil 3, and, at the same time, the movable body 21 is slightly moved to a point of contact between the flat foil 2 and the corrugated foil 3 to insert the brazing foil 5a into the point of contact between the flat foil 2 and the corrugated foil 3. The inserted brazing foil 5a is pulled toward the winding direction and wound together with the flat foil 2 and the corrugated foil 3. Since the holding jig 18 lightly holds the brazing foil 5a, there is no fear of the brazing foil 5a being broken upon the application of tension.

After the insertion of the brazing foil 5a, the holding jig 18 is allowed to ascend, and the support 20 is rotated and returned to its original position. Further, the movable body 21 is returned to the position for holding a brazing foil. During this period, the holding jig 18 is rotated and returned to the original position for holding a brazing foil and brought to a state ready for receipt, holding and insertion of a brazing foil which is next fed.

The above steps constitute one cycle of operations for inserting the brazing foil 5a.

The insertion of the brazing foil 5b can be done in the same manner as described above, except that the brazing foil inserting device 13b is used.

The operations of the elements constituting the brazing foil inserting mechanism, such as the rotation of the pinch rolls 16, the holding, rotation, and vertical movement of the holding jig 18, the operation of the brazing foil cutter 19, the movement of the movable body 21, and rotation of the support 20, are performed by drive units such as motors and pneumatic mechanisms. These operations should be timely performed in connection with the operation of the winding shaft. For this reason, the brazing foil inserting mechanism is controlled, by the mechanism shown in FIG. 1, through an interlock with the operation of the winding shaft.

The timing for the insertion of the brazing foil is determined by conditions including the dimension of the metallic honeycomb body, the dimensions of the flat foil and the corrugated foil for forming the metallic honeycomb body, the dimension of the brazing foil, the winding speed, and the joint interval. When the brazing foil is inserted at short intervals, the insertion cycle time should be shortened. Since, however, the shortening of the insertion cycle time is limited from the viewpoint of the mechanism, provision of a plurality of inserting mechanisms should also be considered.

Figure 5A:
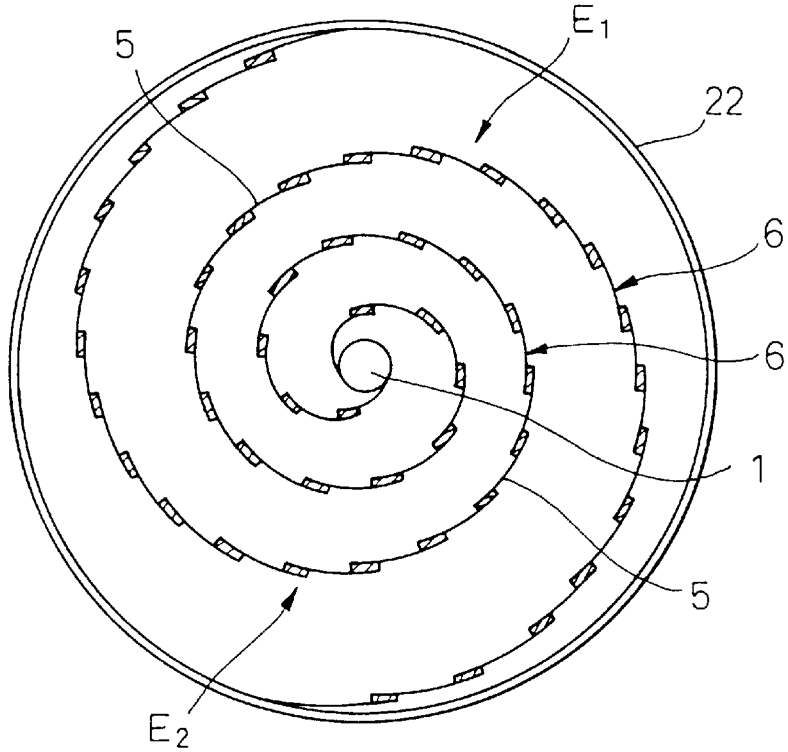
FIG. 5 (A) is a plan view showing one example of arrangement of joints in a metallic honeycomb body prepared in a working example of the present invention, and FIG. 5 (B) is a plan view showing another example of arrangement of joints in a metallic honeycomb body.
Figure 5B:
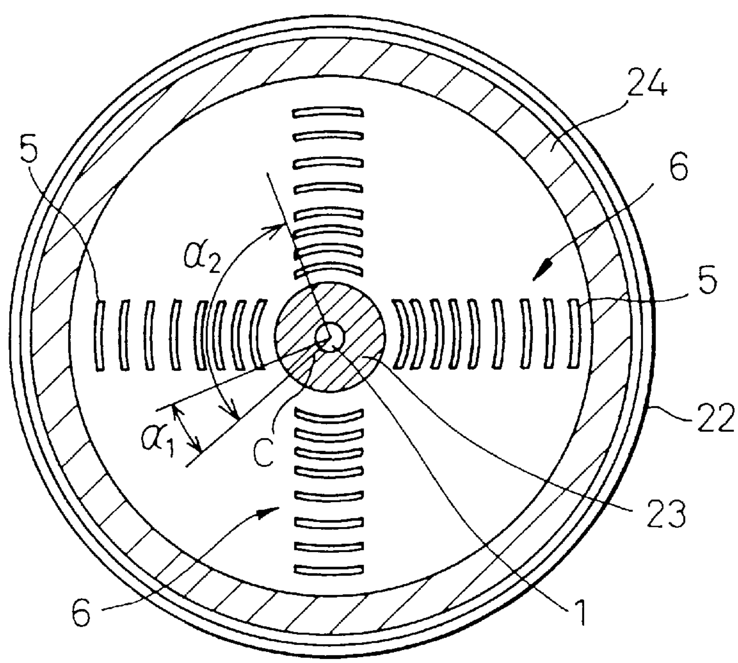

Although the present invention has been described above with reference to an embodiment wherein, in the formation of a metallic honeycomb body using a strip of a flat foil and a strip of a corrugated foil, brazing foils 5a are intermittently inserted so as to partially overlap with each other, thereby providing joints which continuously provide the electrical conducting function (electrical conducting passage) in the direction of diameter of the metallic honeycomb body, it is not limited to this embodiment. For example, as shown in FIG. 5 (A), two electric passages E1, E2 may be provided to further shorten the time taken for the activation of a catalyst. Further, when a plurality of strips of flat foils and corrugated foils are wound to form a metallic honeycomb body, the brazing foil may be inserted for each strip.

Furthermore, the present invention may be used for the production of a metallic honeycomb body of a type which is not incorporated in an electric heating type catalytic converter.

For example, in the insertion of a brazing foil 5 into a joint site 6, as shown in FIG. 5 (B), in order to join the flat foil and the corrugated foil to each other for constituting a metallic honeycomb body, data on sites for the insertion of the brazing foil are previously input into a setter, the winding angle to the winding origin C is detected with an angle detector, and, when each layer for constituting the metallic honeycomb body has reached the preset angle $\alpha_1$, $\alpha_2$ or the like, signals for driving are transmitted to the brazing foil inserting device to successively insert the brazing foil in the above sites. This enables desired joint sites to be surely formed. Numeral 23 designates an inner layer joint, and numeral 24 an outer layer joint.

Thus, in the present invention, in the course of winding of a flat foil 2 and a corrugated foil 3 into a spiral form to produce a cylindrical honeycomb body, a brazing foil can be inserted into predetermined sites between the flat foil and the corrugated foil with a good accuracy. This enables honeycomb bodies, free from a variation in quality, to be stably produced and, hence, can improve the yield, thus resulting in improved productivity.

In order to demonstrate the above effects of the present invention, the results of an experiment on the purification of an automobile exhaust gas by an electric heating type catalytic converter using a metallic honeycomb body, produced by the process of the present invention, as a catalyst carrier, together with the results of a comparative experiment using the conventional metallic honeycomb body, are summarized in Table 1.

The honeycomb body used in this experiment was as shown in FIG. 5 (A), that is, one produced by spirally winding a strip of a flat foil 2 and a strip of a corrugated foil 3, with the flat foil 2 and the corrugated foil 3 stacked on top of the other, on a winding shaft (a central electrode) 1 into a cylindrical form. The honeycomb body thus obtained was inserted into a casing (an external electrode) 22. All the brazing foils 5 for forming joints 6, which can be energized, inserted between the flat foil 2 and the corrugated foil 3 had the same dimension and were disposed so that the distances between joints in the circumferential direction were constant.

Honeycomb body

Outer diameter: 85 mm

Central electrode (material: ferritic stainless steel)

Diameter: 8 mm

Corrugated foil (material: ferritic stainless steel)

Width: 20 mm, thickness: 0.05 mm, wave height: 1.25 mm, wave pitch: 2.5 mm

Flat foil (material: ferritic stainless steel)

Width: 20 mm, thickness: 0.05 mm

Brazing foil

Width: 1 mm, thickness: 0.05 mm, length: 12 mm

Width of overlap between joints: 4 mm

Winding speed: 5 m/min

Insulating material: oxide foil

As shown in Table 1, for the honeycomb body of an example of the present invention, the error of the distance between adjacent joints relative to the preset value was very small, the width of the overlap between adjacent joints in the radial direction was uniform, and the variation in electric resistance was small.

On the other hand, for the conventional honeycomb body produced by mounting a brazing foil, which has been previously cut into a predetermined length, on both sides of the flat foil so that the mounted brazing foils are symmetrical about the flat foil, and spirally winding the flat foil and the corrugated foil with the flat foil and the corrugated foil stacked on top of the other, slippage occurred in the course of winding. Due to this unfavorable phenomenon, the width of the overlap between adjacent joints in the radial direction was not uniform, the number of joints which do not overlap with an adjacent joint in the radial direction was not small, and the variation in electric resistance was much larger than that in the case of the honeycomb body of the present invention.

TABLE 1

| | Distance between joints, variation± % | Width y of overlap, variation± % | Variation in electric resistance, % |
|---|---|---|---|
| Ex. | ±1.5 | 2 | 2 |
| Comp.Ex. | 20 | 25 | 25 |

Note) Comp.Ex.: The joints were formed by previously mounting a brazing foil onto the flat foil.

Although the invention has been described in its preferred form with a certain degree of particularity, it should be understood that the present disclosure of the preferred form can be changed in the details of construction and the combination and arrangement of parts without departing from the spirit and the scope of the invention as hereinafter claimed.

We claim:

1. A process for producing a metallic honeycomb body for supporting a catalyst used for an electric heating type catalytic converter, comprising the steps of: spirally winding a metallic flat foil and a metallic corrugated foil together, with the metallic flat foil stacked on the metallic corrugated foil, on a winding shaft; in the course of winding, inserting and enfolding at a first oblique insertion angle a first brazing foil, previously cut into a predetermined size, at a first position where the metallic corrugated foil begins to come into contact with the outer surface of previously wound metallic flat foil; inserting and enfolding at a second oblique insertion angle a second previously cut brazing foil between the outer surface of the metallic corrugated foil and the inner surface of the metallic flat foil at a second position displaced from said first position along the circumferential length of the wound body by a circumferential arc shorter than said predetermined size and, thus joining the inner and outer sides of the metallic corrugated foil to metallic flat foil in each layer of the spirally wound metallic honeycomb body.

2. The process according to claim 1, wherein a brazing foil is inserted into between the inner surface of the metallic corrugated foil and the outer surface of the metallic flat foil at a position substantially identical to the position where the brazing foil is inserted into between the outer surface of the metallic corrugated foil and the inner surface of the metallic flat foil, thereby forming a joint between the metallic corrugated foil and the metallic flat foil.

3. The process according to claim 1, wherein the desired position for inserting the brazing foil is preset as a desired position for each layer in the metallic honeycomb body.

4. A process for producing a metallic honeycomb body for supporting a catalyst used for an electric heating type catalytic converter, comprising the steps of: spirally winding a metallic flat foil and a metallic corrugated foil together, with the metallic flat foil stacked on the metallic corrugated foil, on a winding shaft; presetting in a setter a brazing foil insertion site, for each layer in a spiral form, in terms of an angle from the winding start point in the winding shaft; detecting a winding angle, for winding the metallic foil, by means of an angle detector and inputting detected signals into a computing unit; comparing the detected signals with preset signals previously input from the setter; transmitting signals to a drive control device when the detected signals coincide with the preset signals; and, in response to the signals, driving a first brazing foil inserting device through the drive control device to insert and enfold at a first oblique insertion angle a first brazing foil, previously cut into a predetermined size, at a first position where the metallic corrugated foil begins to come into contact with the outer surface of previously wound metallic flat foil; driving a second brazing foil inserting device through the drive control device to insert and enfold at a second oblique insertion angle a second previously cut brazing foil between the outer surface of the metallic corrugated foil and the inner surface of the metallic flat foil at a second position displaced from said first position along the circumferential length of the wound body by a circumferential arc shorter than said predetermined size and, thus joining the inner and outer sides of the metallic corrugated foil to metallic flat foil in each layer of the spirally wound metallic honeycomb body.

5. An apparatus for the production of a metallic honeycomb body for supporting a catalyst used for an electric heating type catalytic converter, comprising: a winding shaft on which a metallic corrugated foil and a metallic flat foil are wound together, with the metallic flat foil stacked on the metallic corrugated foil, to form a metallic honeycomb body in a spiral form; an angle detector for detecting an angle from the winding start point of the winding shaft; a setter for presetting a brazing foil insertion site, for each layer in a spiral form, in terms of an angle from the winding start point of the winding shaft; a computing unit for receiving detected signals from the angle detector and preset signals from the setter and comparing the detected signals with the preset signals; and a first brazing foil inserting device driven through a drive control device in response to signals from the computing unit for inserting and enfolding at a first oblique insertion angle a first brazing foil, previously cut into a predetermined size, at a first position where the metallic corrugated foil begins to come into contact with the outer surface of previously wound metallic flat foil; a second brazing foil inserting device driven through the drive control device in response to signals from the computing unit for inserting and enfolding at a second oblique insertion angle a second previously cut brazing foil between the outer surface of the metallic corrugated foil and the inner surface of the metallic flat foil at a second position displaced from said first position along the circumferential length of the wound body by a circumferential arc shorter than said predetermined size and, thus joining the inner and outer sides of the metallic corrugated foil to metallic flat foil in each layer of the spirally wound metallic honeycomb body.

6. The apparatus according to claim 5, wherein each brazing foil inserting device comprises: a holding jig for holding a cut brazing foil; and a movable body for rotatably or vertically movably supporting the holding jig.

7. A process for producing a metallic honeycomb body for supporting a catalyst used for an electric heating type catalytic converter, in which a joined portion is used as an electric passage between a metallic corrugated foil and a metallic flat foil, comprising the steps of: spirally winding a metallic flat foil and a metallic corrugated foil together, with the metallic flat foil stacked on the metallic corrugated foil, on a winding shaft; in the course of winding, inserting and enfolding at a first oblique insertion angle a first brazing foil, previously cut into a predetermined size, at a first position where the metallic corrugated foil begins to come into contact with the outer surface of previously wound metallic flat foil; inserting and enfolding at a second oblique insertion angle a second previously cut brazing foil between the outer surface of the metallic corrugated foil and the inner surface of the metallic flat foil at a second position displaced from said first position along the circumferential length of the wound body by a circumferential arc shorter than said predetermined size and, thus joining the inner and outer sides of the metallic corrugated foil to metallic flat foil in each layer of the spirally wound metallic honeycomb body.

8. An apparatus for producing a metallic honeycomb body for supporting a catalyst used for an electric heating type catalytic converter, comprising: means for spirally winding a metallic flat foil and a metallic corrugated foil together, with the metallic flat foil stacked on the metallic corrugated foil, on a winding shaft; means for presetting in a setter a brazing foil insertion site, for each layer in a spiral form, in terms of an angle from the winding start point in the winding shaft; means for detecting a winding angle, for winding the metallic foil, by means of an angle detector and means for inputting detected signals into a computing unit; means for comparing the detected signals with preset signals previously input from the setter; means for transmitting signals to a drive control device when the detected signals coincide with the preset signals; and, in response to the signals, means for driving a first brazing foil inserting device to insert and enfold at a first oblique insertion angle a first brazing foil, previously cut into a predetermined size, at a first position where the metallic corrugated foil begins to come into contact with the outer surface of previously wound metallic flat foil; means for driving a second brazing foil inserting device to insert and enfold at a second oblique insertion angle a second previously cut brazing foil between the outer surface of the metallic corrugated foil and the inner surface of the metallic flat foil at a second position displaced from said first position along the circumferential length of the wound body by a circumferential arc shorter than said predetermined size and, thus joining the inner and outer sides of the metallic corrugated foil to metallic flat foil in each layer of the spirally wound metallic honeycomb body.

* * * * *